United States Patent [19]
Block et al.

[11] Patent Number: 5,803,544
[45] Date of Patent: Sep. 8, 1998

[54] SEAT CONSTRUCTION WITH REMOVABLE SIDE CUSHIONS

[75] Inventors: Wayne R. Block, South Milwaukee; Douglas P. Gennrich, Cudahy; Paul C. Bostrom, Wauwatosa, all of Wis.

[73] Assignee: H. O. Bostrom Company, Inc., Waukesha, Wis.

[21] Appl. No.: 699,111

[22] Filed: Aug. 16, 1996

[51] Int. Cl.$^6$ .................................................. A47C 7/14
[52] U.S. Cl. .............................. 297/284.3; 297/188.04; 297/440.2
[58] Field of Search ............................. 297/217.1, 440.2, 297/188.04, 188.07, 284.3

[56] References Cited

U.S. PATENT DOCUMENTS

| | | | |
|---|---|---|---|
| 4,989,425 | 2/1991 | Mundy | 297/440.2 |
| 5,062,677 | 11/1991 | Jay et al. | 297/440.2 |
| 5,211,446 | 5/1993 | Jay et al. | 297/440.2 |
| 5,213,392 | 5/1993 | Bostrom et al. | 297/188.04 |
| 5,275,462 | 1/1994 | Pond et al. | 297/188.04 |
| 5,342,109 | 8/1994 | Berry et al. | 297/217.1 X |
| 5,407,248 | 4/1995 | Jay et al. | 297/440.2 X |

*Primary Examiner*—Peter M. Cuomo
*Assistant Examiner*—Stephen Vu
*Attorney, Agent, or Firm*—Andrus, Sceales, Starke & Sawall

[57] ABSTRACT

An emergency conveyance seat comprises a base and a back extending upwardly from the base. The back has a pair of elongated side pads, each of which has an upper end and a lower end. The back further has a head pad located adjacent the upper ends of the side pads. The side pads define a vertically elongated cavity in the back and an enclosure is connected to the side pads for enclosing the rear of the cavity. The cavity is adapted to receive a removable cylinder of a self-contained breathing apparatus. Each of the side pads is formed with a recessed area between the upper and lower ends and is adapted to receive a portion of the cylinder. A pair of removable side cushions is provided, each of the side pads being adapted to be disposed in one of the recessed areas when the cylinder is removed from the cavity.

12 Claims, 3 Drawing Sheets

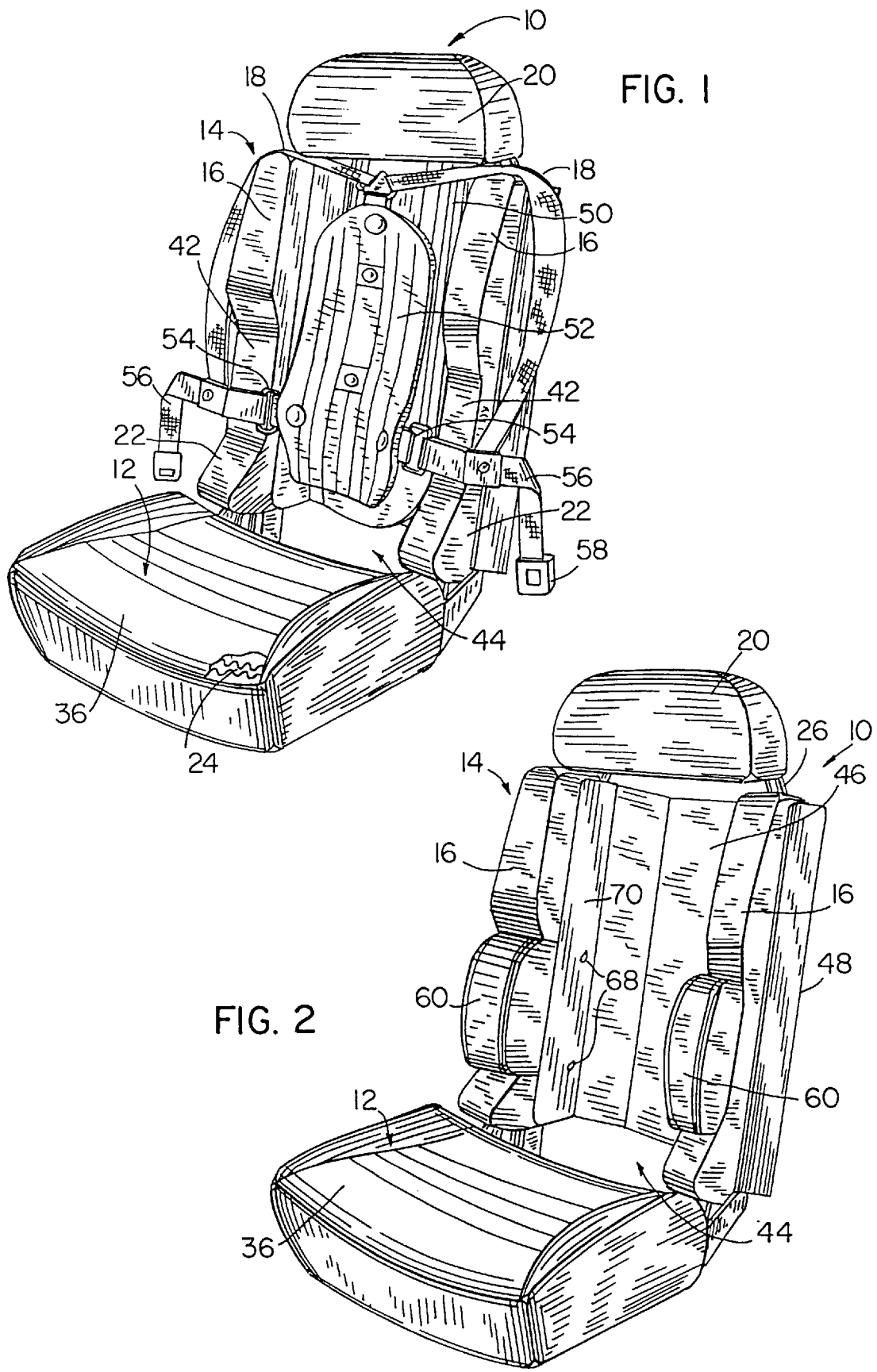

SEAT CONSTRUCTION WITH REMOVABLE SIDE CUSHIONS

FIELD OF THE INVENTION

This invention relates broadly to a seat construction and, more particularly, pertains to a seat construction which may be modified to enhance the comfort of the seat occupant.

BACKGROUND OF THE INVENTION

Fire fighters are provided with self-contained breathing apparatus (SCBA), which includes an air cylinder that is strapped to the fire fighters' back when the fire fighter enters a burning or hazardous area. The SCBA is normally stored in the fire truck, and in some cases, the truck is provided with a post, column, or bracket and several SCBA are clamped to the posts. With this arrangement, the fire fighter at the scene of the fire must then unclamp the cylinder, remove the SCBA from this mounting device, and then strap the SCBA to his body. This procedure can require a number of seconds which can be critical when dealing with a fire. In other cases, the backs of the seats in the fire rescue truck are manufactured with elongated central cavities and the air cylinders of the SCBA are clamped, or otherwise secured, in the cavities for storage.

The recent trend has been for the fire fighter to strap the SCBA to his body while the fire fighter is seated on the seat in the fire truck, with the SCBA stored in the cavity in the seat back. With this arrangement, precious seconds can be saved, due to the fact that the fire fighter does not have to remove the SCBA and strap the SCBA to his body at the scene of the fire.

Some SCBAs include a mounting pad which is connected to the air cylinder and is adapted to be strapped by a harness or belt arrangement to the back of the fire fighter while the fire fighter occupies the seat of the fire truck. The harness or belt arrangement of such mounting pad, in some cases, is associated with a pair of movable buckles, each of which projects from one side of the mounting pad in a position extending generally forwardly thereof and which pivots outwardly therefrom to allow wrapping of the harness or belt arrangement about the torso of the fire fighter. In other cases, the mounting pad is designed with a fixed buckle arrangement which rigidly extends from each side of the mounting pad. Previously, there has been no provision in the construction of a seat to accommodate these types of SCBA construction with the result that, on the one hand, the movable buckles are unable to pivot outwardly and project uncomfortably into the back of the seated fire fighter. In other situations, the fixed buckle arrangement protrudes into the side members of the seat causing damage or destruction thereto. In still other cases, the SCBA may be provided without a buckle arrangement.

It would be extremely desirable to provide a seat construction which allows for these SCBA constructions by directing any projecting buckles away from the fire fighters back without impairing the attachability of the mounting pad and associated air cylinder. It is also desirable to provide a seat construction which may be modified to enhance the comfort of the seat occupant irregardless of the type of SCBA being used.

SUMMARY OF THE INVENTION

The present invention is directed to an improved seat construction that has particular application for use in a fire truck or other conveyance vehicle. The seat advantageously provides for the comfort of the seat occupant whether or not an SCBA is installed to the rear of the seat. The invention is a simple and inexpensive solution for modifying the construction of a seat as dictated by the demands of the seat occupant.

In one aspect of the invention, a seat construction for an emergency conveyance comprises a seat base, and a back extending upwardly from the base. The back comprises a pair of elongated side members spaced apart to provide a forwardly facing cavity therebetween. A life support unit having an extendable portion thereon is disposed in the cavity. At least one of the side members has a recessed area adapted to receive the extendable portion of the life support unit. At least one removable side cushion is adapted to be disposed in the recessed area when the life support is removed from the cavity.

In another aspect of the invention, an emergency conveyance a seat construction comprises a base, and a back extending upwardly from the base. The back has a pair of elongated side pads, each of the side pads having an upper end and a lower end. The back further has a head pad located adjacent the upper ends of the side pads. The side pads define a vertically elongated cavity in the back and are connected with an enclosure for enclosing the rear of the cavity. The cavity is adapted to receive a removable cylinder of a self-contained breathing apparatus. Each of the side pads is formed with a recessed area between the upper and lower ends adapted to receive a portion of the cylinder. A pair of removable side cushions are provided such that each of the side cushions is adapted to be disposed in one of the recessed areas when the cylinder is removed from the cavity.

In still another aspect of the invention, a seat construction comprises a base and a back extending upwardly from the base. The back has a pair of elongated side pads spaced apart to provide a forwardly facing cavity therebetween. A life support having a portion extending laterally outwardly from at least one side therefrom is disposed in the cavity. Each of the side pads is formed with a recessed area, at least one of the recessed areas being adapted to receive the portion of life support. A pair of removable side cushions are provided such that each is adapted to be disposed in one of the recessed areas when the portion of the life support is removed from at least one of the recessed areas.

In another aspect of the invention, a seat construction comprises a seat base, and a back extending upwardly from the base. The back has a pair of elongated side members spaced apart to provide a forward facing cavity therebetween. A removable life support unit is disposed in the cavity, at least one of the side members having a recessed area and at least one removable side cushion being disposed in the recessed area.

In yet another aspect of the invention, a seat construction comprises a seat base and a back extending upwardly from the base. The back has a pair of elongated side members spaced apart. At least one of the side members has a recessed area and at least one removable side cushion is disposed in the recessed area.

In still yet another aspect of the invention, a seat construction comprises a seat base and a back extending upwardly from the base. The back has a pair of elongated side members spaced apart to provide a cavity therebetween. At least one of the side members has a recessed area, and at least one removable side cushion is disposed in the recessed area and the cavity.

Other objects and advantages will appear in the course of the following description.

BRIEF DESCRIPTION OF THE DRAWINGS

The drawings illustrate the best mode presently contemplated of carrying out the invention in the drawings.

FIG. 1 is a perspective view of a seat construction embodying the present invention with removable side cushions detached from the side pads of the seat and an SCBA in place;

FIG. 2 is a perspective view of a seat construction embodying the present invention with removable side cushions installed;

FIG. 5 is an exploded view of the side cushion attachment shown in FIG. 4; and.

DETAILED DESCRIPTION OF THE ILLUSTRATED EMBODIMENT

Figure 4:
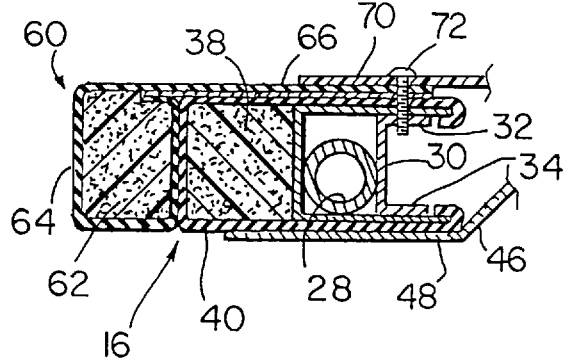
FIG. 4 is a sectional view taken on line 4—4 of FIG. 3 and illustrating the attachment of a removable side cushion to a recessed area formed in the side pad.
Figure 3:
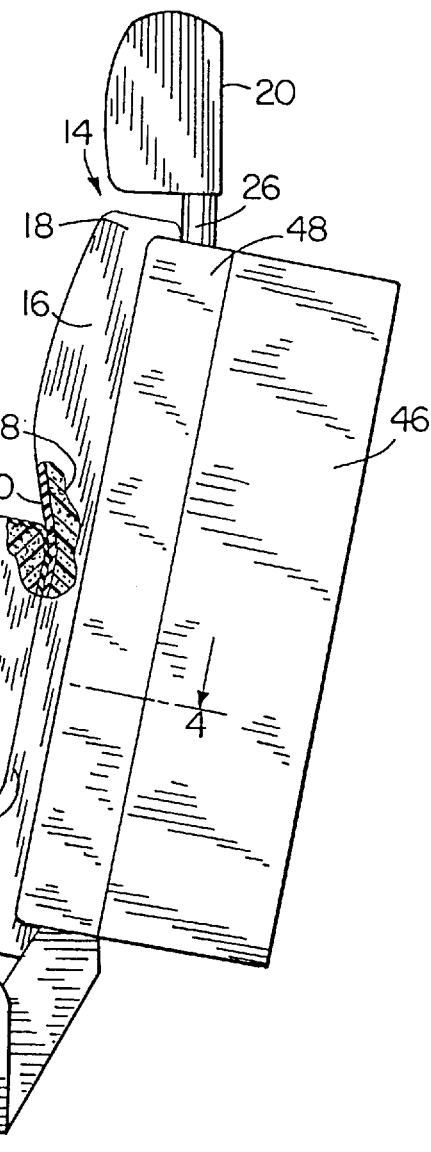
FIG. 3 is a partial view taken from the right side of FIG. 2.

The drawings illustrate a seat 10 which has particular application for use in a fire truck. The seat 10 includes a base 12 and a back 14 extends upwardly from the rear of the base 12. Back 14 can either be fixed to the base 12 as shown, or it can be mounted for tilting or pivoting movement relative to the base 12. In the latter case, the back 14 is connected to the base 12 such that by manual release of a conventional tilt mechanism, the back 14 can be tilted in a fore-and-aft direction relative to base 12.

Back 14 is composed of a pair of elongated, spaced apart side members or pads 16, the upper ends 18 of which are connected by a head pad 20 which is biased or urged to the head supporting position as more fully disclosed in Bostrom et al. U.S. Pat. No. 5,213,392, which is herein incorporated by reference. The lower ends 22 of the side pads 16 are fixed to a conventional seat frame 24.

Figure 5:
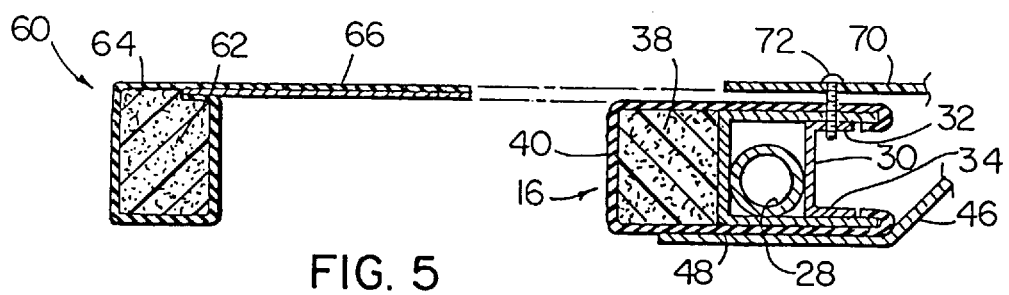

Back 14 includes a tubular frame 26 formed by a pair of generally vertical legs 28, only one of which is shown in cross-section in FIGS. 4 and 5. Attached to the rear portion of each vertical leg 28, such as by welding, is a U-shaped channel 30 which includes an inner member 32 and an outer member 34, and runs substantially along the entire length of each leg 28. The lower ends of the vertical legs 28 are connected by the seat frame 24 which is cushioned and protected with a suitable plastic or fabric covering 36, as shown in FIG. 1.

Side pads 16 of back 14 include a foam element 38 which is located outwardly of frame 26 and a plastic or fabric coating 40 is secured around each foam element 38. As will be appreciated hereafter, each side pad 16 is formed along its lower portion with a recessed area 42.

As best illustrated in FIG. 2, the space between side pads 16 defines an elongated cavity or opening 44, and the rear of the cavity is enclosed by a sheet metal enclosure 46 which is generally U-shaped in horizontal cross-section. The side edges of closure 46 are provided with flanges 48 which are secured by fasteners 49 to the outer member 34 of channel 30 and side pad 16, and run along a corner portion formed by the back and sides of the side pads 16.

Both the top and the bottom ends of the closure 46 are open and a lip (not shown) is provided on the lower end of the closure 46 inwardly below the open bottom of the closure to provide a support for an air cylinder 50 of a self-contained breathing apparatus, SCBA, located within the cavity 44. As shown in FIG. 1, SCBA 50 includes a mounting pad 52 which is adapted to fit around the back of a fire fighter occupied in the seat. In the preferred embodiment, mounting pad 52 includes a pair of movable buckles 54 which are connected with straps, a harness or a belt arrangement 56 adapted to be disposed about the torso of a fire fighter. Straps 56 can be provided with buckle fasteners 58, or hook and loop fasteners sold under the VELCRO and other trade names which provide a convenient means of connecting the straps around the cylinder 50. Each of the buckles 54 is designed to swing from one side of the mounting pad 52 between a first position extending generally forwardly therefrom and a second position (shown in FIG. 1) in which each buckle 54 pivots laterally and outwardly from mounting pad 52 into one of the recessed areas 42 when the fire fighter occupies a seat and attaches the mounting pad 52 and SCBA 50 against his or her back using straps 56. Without the recessed area 42, the buckles 54 would be unable to pivot outwardly and would project uncomfortably into the back of the fire fighter.

If for some reason the SCBA 50 described above is removed or otherwise replaced with a different type of SCBA not having an outwardly and laterally extending buckle 54 or the like, the seat occupant may experience a lack of support in the vicinity of the recessed areas 42. Accordingly, the invention provides additional support in the form of a pair of removable side cushions 60 which are adapted to easily and simply fill the voids formed by the recessed areas 42. Each of the side cushions 60 is comprised of a foam construction 62 having a plastic or fabric coating 64 which generally compliments that employed on the corresponding side pads 60. Each side cushion 16 also includes a generally rectangular, vinyl or fabric coated mounting plate 66 which is attached by fasteners (not shown) to the inner member 32 of each U-shaped channel 30. Plastic liner 70 is attached by fasteners 72 to inner member 32 of channel 30 and side pad 16.

Figure 6:
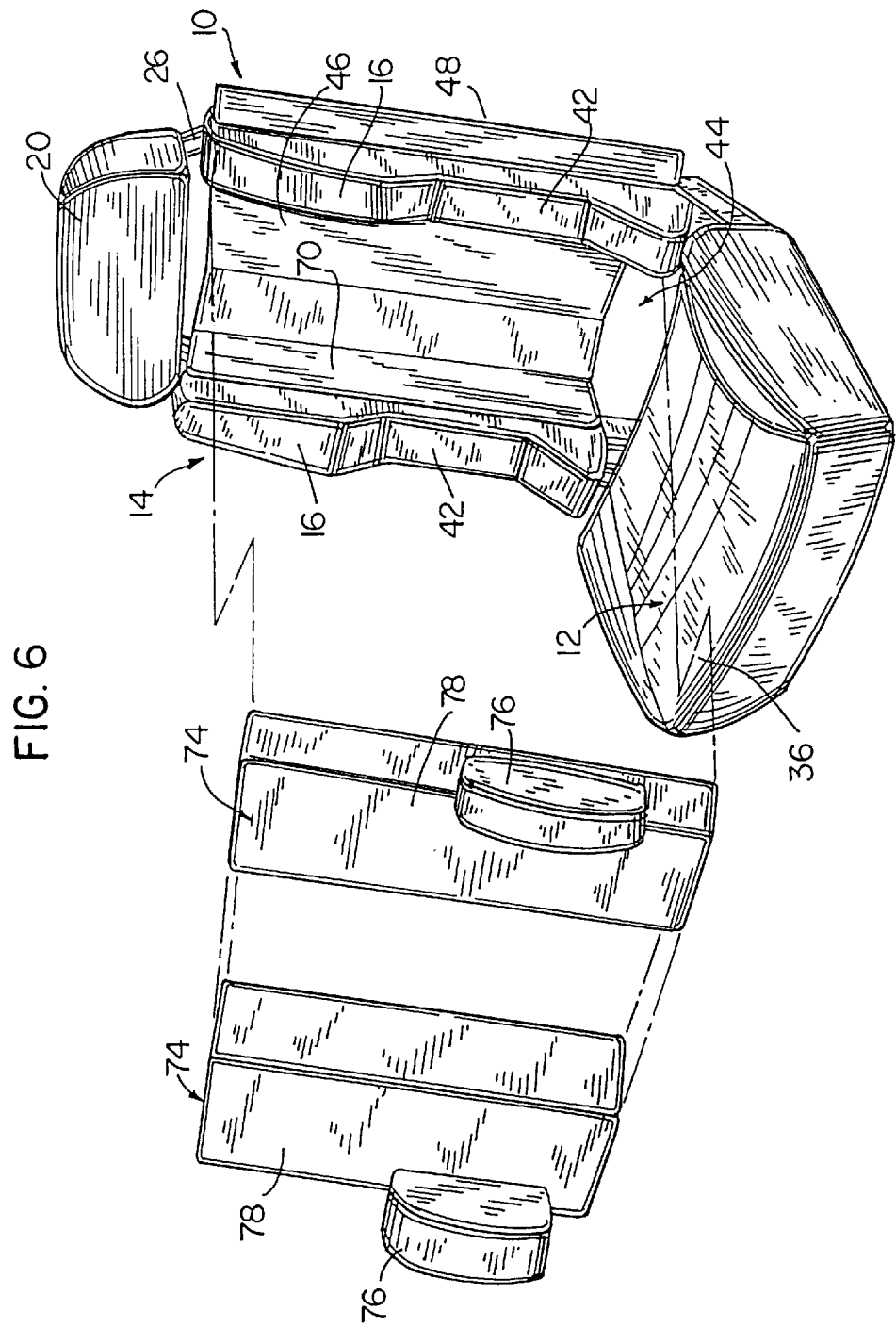
FIG. 6 is an exploded, perspective view of an alternative embodiment of the invention.

While the drawings illustrate the mounting pad 52 having moving buckles 54, it should be understood that a mounting pad 52 with fixed buckles extending laterally into the recessed areas 42 could also be employed. While the invention has particular application for use as a seat in a fire truck or emergency conveyance to contain a SCBA cylinder, it is contemplated that the seat can be used in other applications where it is desired to provide a cavity in the seat for storage purposes. Alternatively, if the seat does not require a cavity for storage purposes, the cavity 44 may be filled in with a suitable padded back support and the removable cushions 60 may be added to provide a fully supported seat having an aesthetic contour throughout. The precise size and shape of the recessed areas 42 may vary as long as the removable cushions 60 have a generally complimentary size and shape which will create a comfortable seat when they are secured in place. FIG. 6 shows an alternative embodiment in which a pair of expanded or enlarged one-piece side cushions 74 are used when no SCBA 50 is present or when cavity 46 is left open. Each cushion 74 has a small portion 76 integrally formed with a large portion 78. Large portions 78 collectively fill the cavity 46 while small portions 76 fill recesses 42 as described above.

It should now be appreciated that the present invention comprises a seat construction 10 which provides comfort and support for a seat occupant whose back is disposed against a support member having variously protruding components. The invention also enables a fire fighter seated against the mounting pad 52 of a SCBA 50 to easily and reliably attach the SCBA 50 to his or her back while riding in a fire truck or emergency vehicle. It can also be appreciated that the simplicity of the seat construction contributes to the affordability of the device. Further, it can be seen that the invention contemplates the modification of a seat construction 10 having recessed areas 42 by employing removable side cushions 60 which are easily attached and detached to the frame 26 by manipulation of several common fasteners.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with following claims.

We claim:

1. A seat construction comprising a base and a back extending upwardly from said base, said back having a pair of elongated side pads spaced apart to provide a forwardly facing cavity therebetween, a life support unit adapted to be disposed in said cavity, said life support unit with a portion extending laterally outwardly from at least one side thereof, each of said side pads being formed with a recessed area, at least one of said recessed areas being adapted to receive said portion of said life support unit, and a pair of removable side cushions, each of said cushions being adapted to be disposed in one of said recessed areas immediately forwardly of and against one of said side pads when said portion of said life support unit is adapted to be removed from said at least one of said recessed areas, each of said cushions having a size and a shape complementary to one of said recessed area.

2. The seat construction of claim 1 and including enclosure means extending rearwardly from said back and aligned with said cavity to prevent rear displacement of said life support unit from said cavity.

3. The seat construction of claim 2, wherein said enclosure means comprises an enclosure having a generally U-shaped horizontal cross-section.

4. The seat construction of claim 1, wherein said back includes an inverted, generally U-shaped frame including a pair of generally vertical sections having upper ends and a horizontal section connecting the upper ends of said vertical section, said vertical section being integrally connected to said side members of said back.

5. The seat construction of claim 4, wherein said horizontal section is generally circular in cross-section.

6. An emergency conveyance seat comprising a base, and a back extending upwardly from said base, said back having a pair of elongated side pads, each of said side pads having an upper end and a lower end, said back further having a head pad located adjacent the upper ends of said side pads, said side pads defining a vertically elongated cavity in said back, an enclosure connected to said side pads for enclosing the rear of said cavity, said cavity adapted to receive a removable cylinder of self-contained breathing apparatus, each of said side pads being formed with a recessed area between said upper and lower ends adapted to receive a portion of said cylinder and a pair of removable side cushions, each of said side cushions being adapted to be disposed in one of said recessed areas immediately forwardly of and against one of said side pads when said cylinder is adapted to be removed from said cavity, each of said cushions having a size and shape complementary to one of said recessed areas.

7. The emergency conveyance seat of claim 6 and including enclosure means extending rearwardly from said back and aligned with said cavity to prevent rear displacement of said cylinder from said cavity.

8. The emergency conveyance seat of claim 6, wherein said head pad is movably biased or urged to a head supporting position.

9. A seat construction for an emergency conveyance comprising a seat base, a back extending upwardly from said base, said back comprising a pair of elongated side members spaced apart to provide a forwardly facing cavity therebetween, each of said side members having a forwardly facing surface, a removable life support unit adapted to be disposed in said cavity, said life support with an extendable portion thereon, at least one of said side members having a recessed area adapted to receive said extendable portion of said life support unit, and at least one removable side cushion adapted to be disposed in said recessed area when said life support is adapted to be removed from said cavity, said cushion having a rearwardly facing surface which together with said forwardly facing surface of one of said side members is juxtaposed to define a continuous contour for supporting one's back, said cushion having a size and shape complementary to said recessed area.

10. A seat construction comprising a seat base, a back extending upwardly from said base, said back having a pair of elongated side members spaced apart to provide a forwardly facing cavity therebetween, a removable life support unit adapted to be disposed in said cavity, at least one of said side members having a recessed area and at least one removable side cushion disposable in said recessed area immediately forwardly of and against said side member, said cushion having a size and shape complementary to said recessed area.

11. A seat construction comprising a seat base, a back extending upwardly from said base, said back having a pair of elongated side members spaced apart, at least one of said side members having at least one recessed area and at least one removable side cushion disposable immediately forwardly of and against one of said side members in said at least one recessed area to define a predetermined contour for supporting one's back, said cushion having a size and shape complementary to said recessed area.

12. A seat construction comprising a seat base, a back extending upwardly from said base, said back having a pair of elongated side members spaced apart to provide a cavity therebetween, at least one of said side members having a recessed area, and at least one removable one-piece side cushion disposable in said recessed area and said cavity, each of said cushions having a size and replace complementary to one of said recessed portions.

* * * * *